May 13, 1969     D. H. VOLLMER     3,443,385
MOISTURIZER FOR PLANTS
Filed May 15, 1967
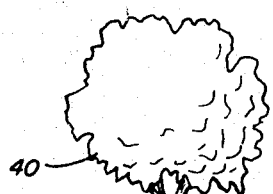
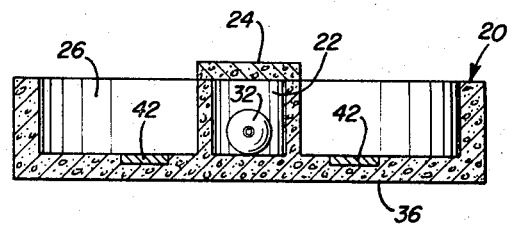
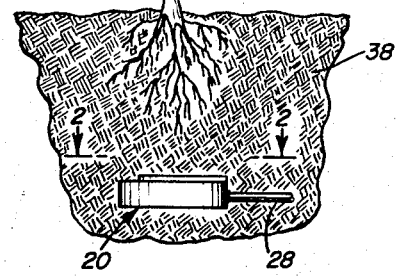
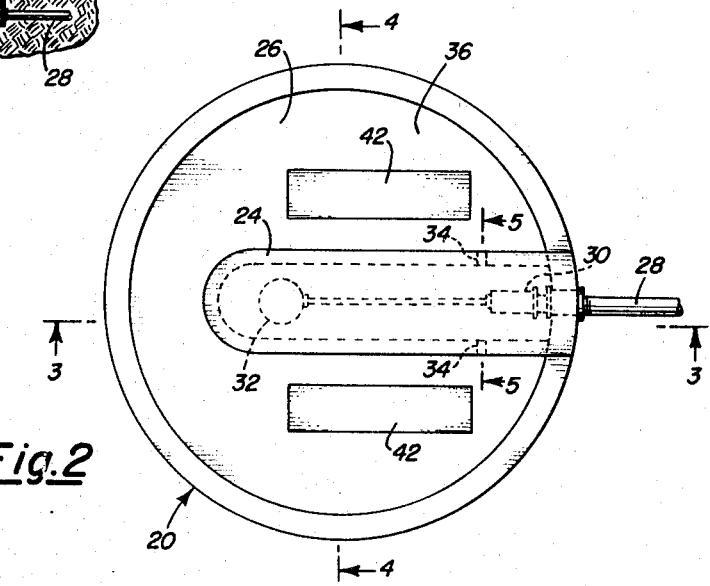
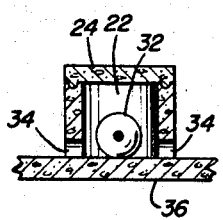
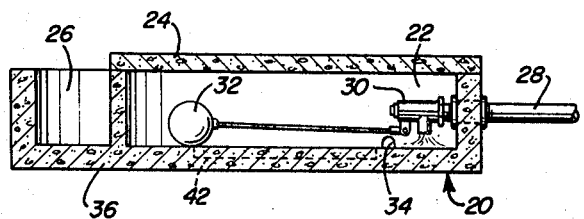
INVENTOR.
*DONN H. VOLLMER*
BY
ATTORNEYS

# United States Patent Office 3,443,385
Patented May 13, 1969

3,443,385
MOISTURIZER FOR PLANTS
Donn H. Vollmer, 4534 Felton St., P.O. Box 16036,
San Diego, Calif. 92116
Filed May 15, 1967, Ser. No. 638,466
Int. Cl. E02b 13/02; A01g 25/00; C23f 13/00
U.S. Cl. 61—13                    3 Claims

ABSTRACT OF THE DISCLOSURE

A method of and a device for automatically maintaining moisture in the earth below plants by controlling the flow of water to a vessel submerged below the plant, and also for preventing corrosion of the valve which controls the flow of water to the vessel.

---

The present invention relates to a method of and a device for maintaining moisture in the earth directly below a plant.

In carrying out the present invention, a vessel for water is submerged in the earth directly below the area where the plant is to be planted or directly below a planted plant. Water is conducted to a closed section of the vessel and the flow to that section is controlled by a float valve. The vessel also includes an open top section connected with the closed top section for receiving water from the latter section.

The vessel is formed of dielectric material, such as concrete. The valve is formed of corrosive material. However, a metal, which is higher in the electro-chemical series than the metal of the valve, is associated with the device for cathodically preventing corrosion of the valve.

Other features and the advantages of the present invention will be apparent from the following description, reference being had to the accompanying drawing wherein a preferred embodiment of the invention is illustrated.

In the drawing:

FIG. 1 is a view showing the improved device embedded in the earth and disposed below a plant, the earth being shown in section;

FIG. 2 is a top plan view of the device, but on a larger scale than shown in FIG. 1; and FIGS. 3, 4 and 5 are sectional views taken along lines 3—3, 4—4, and 5—5 of FIG. 2.

Referring more in detail to the drawing, the device 20 includes a vessel having a closed top section 22 which is provided with a removable cover 24 and an open top section 26 which substantially surrounds the closed top section 22.

Water is delivered to the closed top section 22 through a pipe 28 and the flow of water to the section 22 is controlled by a valve 30 which in turn is controlled by a float 32 for maintaining a substantially constant level of water within the section 22. Closed top section 22 is connected with open top section 26 by a plurality of orifices 34 disposed directly above the bottom 36 of the vessel.

In practicing the invention, the device 20 is submerged in the earth several feet, at least below the frost lines. It can be placed below the area in which the plant is to be planted or can be placed below the planted plant. This is clearly shown in FIG. 1, where the earth is indicated at 38 and the plant at 40.

It has been found in actual practice that by employing the present invention, the earth is maintained moist about the root area of the plant although the top surface of the earth will be dry, the moisture from the open top section 26 moving upwardly due to capillary attraction. It will be understood that the size of the open top section will be varied depending upon the prospective root spreading area of the plant.

Metal strips 42 which are higher in the electro-chemical series than the parts of the valve 30 are contained within the device for cathodically preventing corrosion of the metal parts of the valve. For example, the strips 42 may be formed of zinc and the valve parts formed of copper, brass or stainless steel. The strips 42 are shown as embedded in the base 36 and are exposed to the moist earth in section 26. In addition to preventing corrosion of the metal valve parts 30, the electrolytic action has the characteristics of preventing souring of the earth about the device, and has a further characteristic of causing the root area to branch away from the interior of the open top section 26.

While the form of embodiment herein shown and described, constitutes preferred form, it is to be understood that other forms may be adapted falling within the scope of the claims that follow.

I claim:

1. A submerged automatic moisture control device for a plant, comprising in combination:
    (A) a vessel submerged in the earth, said vessel having:
        (1) a water inlet,
        (2) a cover,
        (3) an opening leading to the exterior thereof,
        (4) an open-top section connected with the opening;
    (B) a valve for controlling the flow of water to the inlet, said valve having metal parts;
    (C) a float for controlling the valve;
    (D) an anode, which is higher in the electro-chemical series than the metal parts of the valve, disposed in the open-top section of the vessel.

2. A device as defined in claim 1, characterized in that the anode is embedded in the open top section.

3. A submerged automatic moisture control device, comprising in combination:
    (A) a vessel submerged below the surface of the earth, said vessel having:
        (1) an elongated section having:
            (a) a bottom wall,
            (b) and connecting side walls,
        (2) a water inlet leading to the section from one end thereof,
        (3) a cover for the section,
        (4) an open-top section formed integrally with the elongated section, said open-top section extending along both sides of the elongated section and about the end thereof opposite said one end,
        (5) an opening connecting the sections, said opening being disposed through one of the side walls of the elongated vessel adjacent the bottom thereof;
    (B) means for controlling the flow of water to the inlet, said means including:
        (1) a valve at the inlet end of the elongated section,
        (2) a float disposed adjacent the opposite end of the elongated section and connected with the valve.

References Cited

UNITED STATES PATENTS

| 1,343,871 | 6/1920 | Lewis | 61—13 |
| 3,183,674 | 5/1965 | Boschen | 61—13 |

FOREIGN PATENTS

| 368,074 | 2/1939 | Italy. |

EARL J. WITMER, Primary Examiner.

U.S. Cl. X.R.

204—148